United States Patent
Ghosh et al.

(10) Patent No.: US 11,809,477 B1
(45) Date of Patent: Nov. 7, 2023

(54) TOPIC FOCUSED RELATED ENTITY EXTRACTION

(71) Applicant: Intuit Inc., Mountain View, CA (US)

(72) Inventors: Pallabi Ghosh, St. Augustine, FL (US); Sparsh Gupta, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/994,854

(22) Filed: Nov. 28, 2022

(51) Int. Cl.
*G06F 17/00* (2019.01)
*G06F 16/38* (2019.01)

(52) U.S. Cl.
CPC .................................. *G06F 16/38* (2019.01)

(58) Field of Classification Search
CPC .......... G06F 16/13; G06F 16/30; G06F 16/38; G06F 16/345; G06F 16/93; G06F 3/048; G06F 3/0483
See application file for complete search history.

(56) References Cited

U.S. PATENT DOCUMENTS

| | | | | |
|---|---|---|---|---|
| 7,743,327 B2* | 6/2010 | Meunier | ................ | G06F 40/258 715/255 |
| 8,756,233 B2* | 6/2014 | AbdAlmageed | .... | G06F 16/7844 707/738 |
| 10,235,681 B2* | 3/2019 | Chang | .................... | G06F 40/237 |
| 11,190,467 B2* | 11/2021 | Dunne | .................... | H04L 51/04 |
| 2008/0201130 A1* | 8/2008 | Peters | ..................... | G06F 40/10 704/9 |
| 2014/0136963 A1* | 5/2014 | Chen | ..................... | G06F 40/258 715/254 |
| 2016/0227282 A1* | 8/2016 | Chang | ................ | H04N 21/4334 |
| 2017/0011009 A1* | 1/2017 | Choi | ................... | G06F 3/04842 |
| 2022/0345489 A1* | 10/2022 | Karabey | ............... | G06F 21/554 |

OTHER PUBLICATIONS

Pavlina Fragkou, Use of named entity recognition and co-reference resolution tools for segmenting english texts. In Proceedings of the 19th Panhellenic Conference on Informatics. Association for Computing Machinery, 331-336. <https://doi.org/10.1145/2801948.2802004>, October (Year: 2015).*

Salil Dabholkar et al., Automatic Document Summarization using Sentiment Analysis. In Proceedings of the International Conference on Informatics and Analytics. Association for Computing Machinery, USA, Article 49, 1-6. <https://doi.org/10.1145/>, August (Year: 2016).*

Papadopoulos et al., What do governments plan in the field of artificial intelligence? Analysing national AI strategies using NLP. In Pro of the 13th International Conference on Theory and Practice of Electronic Governance. Assoc for Computing Machinery, 100-11, <https://doi.org/10.1145/342850>, Sep (Year: 2020).*

(Continued)

*Primary Examiner* — Greta L Robinson
(74) *Attorney, Agent, or Firm* — Paradice & Li LLP

(57) ABSTRACT

This disclosure relates to extracting entities from unstructured text. The unstructured text is segmented into structured segments with one or more instances, that belong to different topics, with a topic segmentation model. Each instances of the structured segment is operated on by an entity extraction model to extract entities, and the extracted entities associated with each topic is produced in a computer-readable format. The relations between extracted entities associated with each topic may be identified.

15 Claims, 7 Drawing Sheets

(56) References Cited

OTHER PUBLICATIONS

Arnold, Sebastian, "SECTOR: A Neural Model for Coherent Topic Segmentation and Classification," Transactions of the Association for Computational Linguistics, vol. 7, pp. 169-184, Apr. 2, 2019.
Beeferman, Doug, "Statistical Models for Text Segmentation," Machine Learning 34, pp. 177-210, 1999.
Floridi, Luciano, "GPT-3: Its Nature, Scope, Limits, and Consequences," Minds & Machines 30, 681-694 (2020). https://doi.org/10.1007/s11023-020-09548-1.
Lo, Kelvin, "Transformer Over Pre-Trained Transformer for Neural Text Segmentation with Enhanced Topic Coherence," Findings of the Association for Computational Linguistics: EMNLP 2021, pp. 3334-3340.
Nadeau, David, "A Survey of Named Entity Recognition and Classification," Aug. 2007, https://www.researchgate.net/publication/44062524_A_Survey_of_Named_Entity_Recognition_and_Classification.
Purver, Matthew, "Topic Segmentation," https://www.researchgate.net/publication/236862989_Topic_Segmentation, Mar. 2011.
Cupani, Maxime, "Advanced NER With GPT-3 and GPT-J," https://towardsdatascience.com/advanced-ner-with-gpt-3-and-gpt-j-ce43dc6cdb9c, Apr. 28, 2022, Downloaded Oct. 21, 2022, 8 Pages.
Brown, Tom B. et al., "Language Models are Few-Shot Learners," arXiv:2005.14165v4 [cs.CL] Jul. 22, 2020, 75 Pages.
Raffel, Colin et al., "Exploring the Limits of Transfer Learning with a Unified Text-to-Text Transformer," arXiv:1910.10683v3 [cs.LG] Jul. 28, 2020, 67 pages.

\* cited by examiner

TOPIC FOCUSED RELATED ENTITY EXTRACTION

TECHNICAL FIELD

This disclosure relates generally to machine learning models, and in particular to techniques and systems for entity extraction using machine learning models.

DESCRIPTION OF RELATED ART

Machine learning is a form of artificial intelligence that uses algorithms to use historical data as input to predict new output values. Machine learning, for example, may be used in a wide variety of tasks, including natural language processing, financial analysis, image processing, generating recommendations, spam filtering, fraud detection, malware threat detection, business process automation (BPA), etc. In general, machine learning uses training examples to train a model to map inputs to outputs. Once trained, a machine learning model may be used to accurately predict outcomes from new, previously unseen data.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable features disclosed herein.

One innovative aspect of the subject matter described in this disclosure can be implemented as a computer-implemented method for extracting text information from an electronic document. An example method includes obtaining unstructured text of the electronic documents and segmenting the unstructured text into structured segments with one or more instances, belonging to different topics, with a topic segmentation model. The method includes extracting entities from each instance of the structured segments with an entity extraction model, and producing extracted entities associated with each topic in a computer-readable format.

Another innovative aspect of the subject matter described in this disclosure can be implemented as a system for extracting text information from an electronic document. An example system includes one or more processors and a memory coupled to the one or more processors and storing instructions that, when executed by the one or more processors, cause the system to perform operations. The system may be caused to obtain unstructured text of the electronic document and segment the unstructured text into structured segments with one or more instances, belonging to different topics, with a topic segmentation model. The system may be further caused to extract entities from each instance of the structured segments with an entity extraction model, and produce extracted entities associated with each topic in a computer-readable format.

Another innovative aspect of the subject matter described in this disclosure can be implemented as a system for extracting text information from an electronic document. An example system includes an interface configured to obtain unstructured text of the electronic document. The system further includes a topic segmentation model configured to segment the unstructured text into structured segments with one or more instances of entities, belonging to different topics. The system further includes an entity extraction model configured to extract entities from each instances instance of the structured segments and to produce extracted entities associated with each topic in a computer-readable format.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

Like reference numbers and designations in the various drawings indicate like elements.

DETAILED DESCRIPTION

Figure 1:
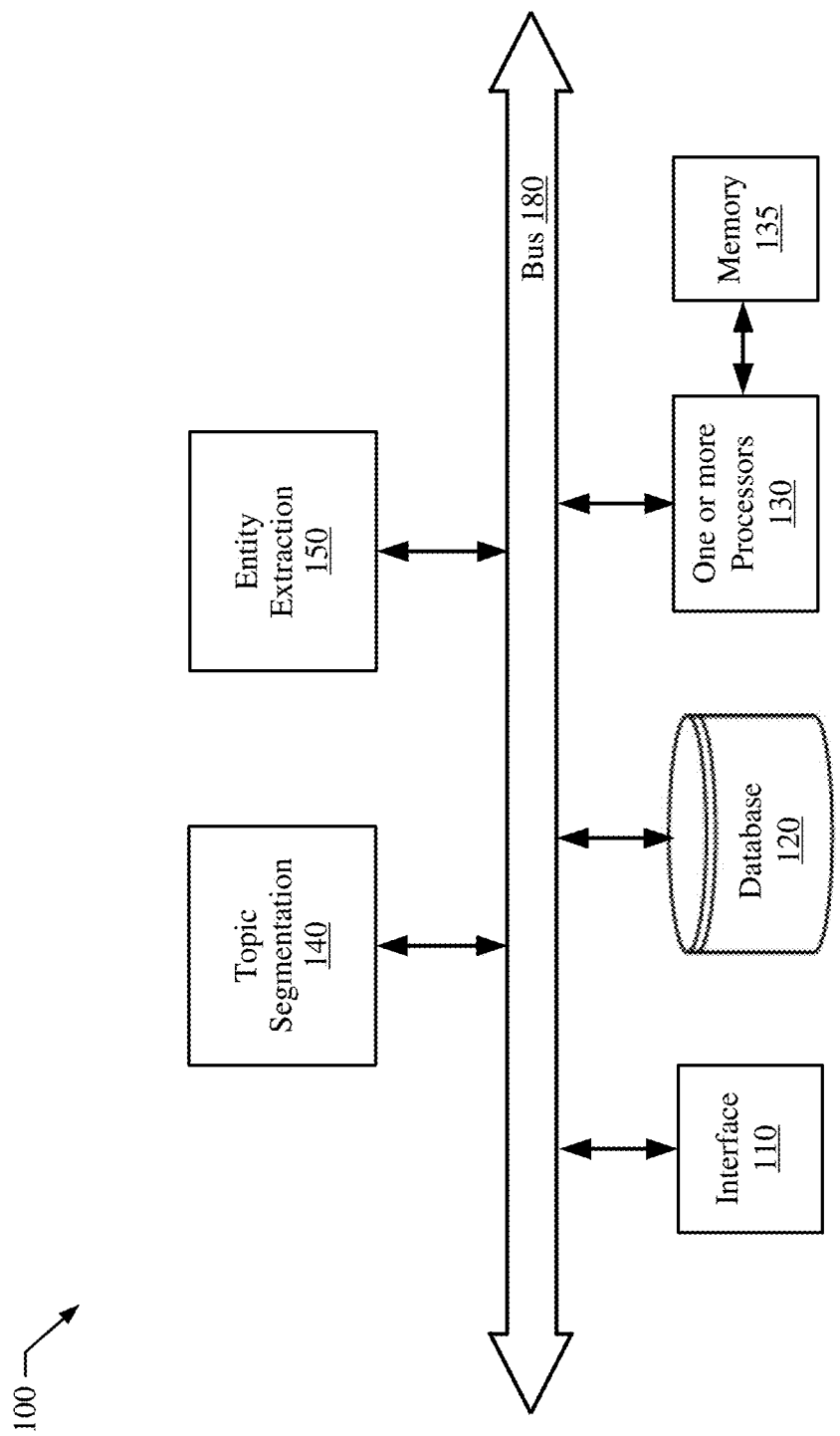
FIG. 1 shows a block diagram of a system configured for entity extraction from text, according to some implementations.

The following description is directed to certain implementations for information extraction from raw input data, and in particular to entity extraction from unstructured input data. Unstructured input data, for example, includes free-form text, such as found in news or science articles, benefit reports, such as for insurance or credit card benefits, or any other data that includes free-form text. It may be readily understood that certain aspects of the disclosed systems and methods can be arranged and combined in a wide variety of different configurations, applications, and use cases, all of which are contemplated herein.

Entity extraction uses Natural Language Processing (NLP) to automatically seek and classify specific data from unstructured text according to predefined categories. Entity extraction, for example, may enable applications to find meaningful information in large amounts of unstructured text data. By way of example, credit card companies use free-form text to describe the benefits associated with their credit cards. In another example, entity extraction may be used to obtain information from articles or reports. Entity extraction may be used to enable clear analysis of data, such as comparing benefits, consolidating information from multiple sources, determining trends, etc. Sometimes, however, unstructured text may contain similar types of data entities for different categories or multiple instances of the same class in a large amount of data, which conventional entity extraction cannot accurately identify.

Entity extraction models, such as Named-Entity Recognition (NER), are information extraction mechanisms that locates and classifies named entities in unstructured text into pre-defined categories. Named-Entity Recognition, however, performs better when the named entities are unique in the unstructured data. For example, credit card data may contain multiple similar types of data entities for different categories, such as "$300 welcome bonus and $300 additional benefits," which may not be correctly identified as separate categories. In another example, credit card data may contain multiple instances of a same class, such as "4×in grocery and travel," and NER may not correctly identify that 4×applies to both grocery and travel.

Another entity extraction tool is Generative Pre-trained Transformer 3 (GPT3), which is an autoregressive language model that uses deep learning to produce human-like text. GPT3 performs a wide variety of natural language tasks, but is difficult to train for a specific type of data. GPT3 is a more generalized and powerful tool for entity extraction than NER. However, GPT3 loses accuracy when a large amount of unstructured text is provided, and performs better when only sentences containing the actual information needed for extraction are provided as input data.

Moreover, it has been found entity extraction models, such as NER or GPT3, perform poorly when a large amount of input data is provided at once, such as all of the credit card benefit data.

The disclosed implementations provide an approach in which a topic segmentation model is added in the pipeline between the raw data and the entity extraction model. The topic segmentation model divides the raw data into smaller groups of topically related blocks of sentences. Each group of sentences contains information about a particular topic. The sentences containing information about a particular topic may be individually provided as input data to the entity extraction models, which may more easily extract specific information from the sentences, e.g., with greater accuracy and less processing power. For example, in implementations discussed, the primary use of processing power is topic segmentation, which may be parallelized, e.g., using transformers. Additionally, by dividing the difficult overall problem into multiple smaller sub-problems, each of these sub-problems may be evaluated in parallel using any entity extraction algorithm leading to efficient utilization of memory caches. Hence, the overall efficiency of the present framework is improved relative to conventional processing techniques.

For example, in some implementations, entity extraction from text by segmenting the text into segments that belong to different topics using a trained topic segmentation model. The segments are provided to an entity extraction model that extracts entities from each segment. For example, specific entities may be assigned to each topic and the entities extracted from each segment may only include entities that are assigned to the topic associated with each respective segment. In some implementations, one or more of topics may include multiple sub-sections, and the entities extracted from each segment are associated with each sub-section within each topic associated with each segment. The extracted entities associated with each topic may then be reported, e.g., produced in a computer-readable format, which may be provided to other applications for desired analysis. Relations between extracted entities associated with each topic may be identified in the report.

In this manner, automated entity extraction may be performed with large quantity of unstructured text with high accuracy in a fast and efficient manner. The automated entity extraction discussed herein improves processing requirements, efficiency, and throughput over conventional entity extraction techniques while also improving performance. Therefore, implementations of the subject matter disclosed herein are not an abstract idea such as organizing human activity or a mental process that can be performed in the human mind, for example, because it is not practical, if even possible, for a human mind to extract information from unstructured text as described herein.

In the following description, numerous specific details are set forth such as examples of specific components, circuits, and processes to provide a thorough understanding of the present disclosure. The term "coupled" as used herein means connected directly to or connected through one or more intervening components or circuits. The terms "processing system" and "processing device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing, and other symbolic representations of operations on data bits within a computer memory.

In the figures, a single block may be described as performing a function or functions. However, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example systems and devices may include components other than those shown, including well-known components such as a processor, memory, and the like.

Several aspects of entity extraction will now be presented with reference to various apparatus and methods. These apparatus and methods will be described in the following detailed description and illustrated in the accompanying drawings by various blocks, components, circuits, devices, processes, algorithms, and the like (collectively referred to herein as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP- GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a block diagram of a system 100 configured for entity extraction from text, according to some implementations. The system 100 is shown to include an input/output (I/O) interface 110, a database 120, one or more processors 130, a memory 135 coupled to the one or more processors 130, a topic segmentation model 140, an entity extraction model 150, and a data bus 180. The various components of the system 100 may be connected to one another by the data bus 180, as depicted in the example of FIG. 1. In other implementations, the various components of the system 100 may be connected to one another using other suitable signal routing resources.

The interface 110 may include any suitable devices or components to obtain information, e.g., input data in the form of text from an electronic document, for the system 100 and/or to provide information, e.g., output data in the form of extracted entities for a plurality of topics in a computer-readable format, from the system 100. In some instances, the interface 110 may include a display and an input device (such as a mouse and keyboard) that allows a person to interface with the system 100 in a convenient manner. For example, the interface 110 may enable a user to interface with the system to define topics and entities associated with topics to be processed by the topic segmentation model 140 and the entity extraction model 150. Additionally or alternatively, the interface 110 may include an ethernet port, wireless interface, or other means to communicate with one or more other devices via wires or wirelessly. In some implementations, the system 100 may host an application for analysis of the data output, e.g., for such consolidating information, comparing information, determining trends, etc.

The topic segmentation model 140 and the entity extraction model 150 may be implemented as one or more special purpose processors, which may be implemented separately or as part of the one or more processors 130. For example, the topic segmentation model 140 and the entity extraction model 150 are illustrated separately from the one or more processors 130 for clarity, but in some implementations, the one or more processors 130 may execute instructions stored in memory 135, which configure the one or more processors 130 to perform one or more functions described herein. In the context of this particular specification, the one or more processors 130 may be a general purpose computer that once programmed pursuant to instructions stored in memory operates as a special purpose computer to perform one or more functions of the topic segmentation model 140 and the entity extraction model 150, described herein.

Figure 2A:
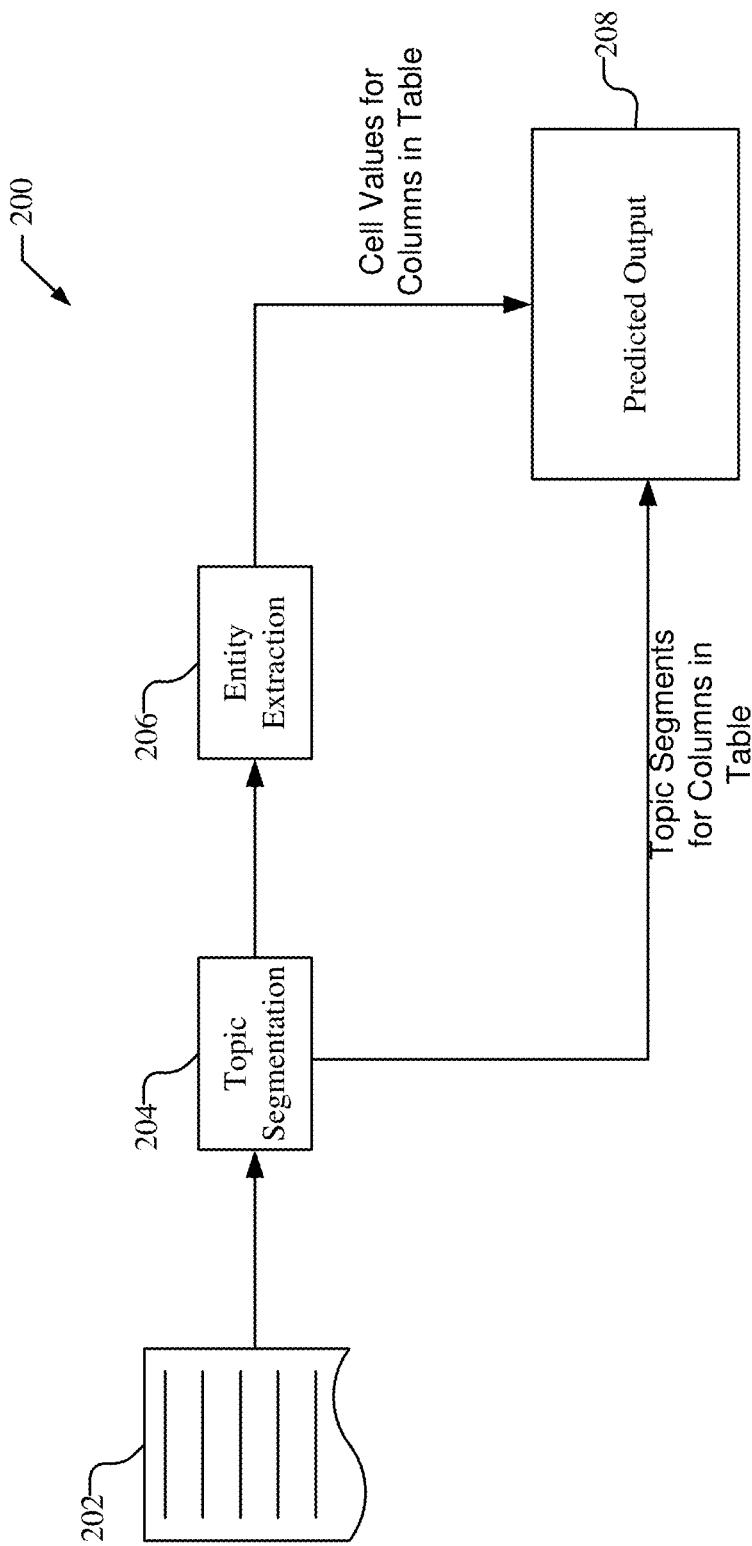
FIG. 2A shows an illustrative architecture of a framework for entity extraction, according to some implementations.

FIG. 2A illustrates an illustrative architecture of a framework 200 for entity extraction, according to some implementations. The framework 200, for example, may be implemented by the system 100 using topic segmentation model 140, the entity extraction model 150, and database 120. It is to be understood that the framework 200 may be performed by other suitable systems, computers, or servers.

As illustrated, text of an electronic document is obtained (202). The text, for example, may be computer readable text associated with a text capture of a document, such as a report or article. In some implementations, a separate computing system may ingest documents (such as receiving image captures of paper documents, receiving pdfs, etc.), and text in the documents are identified and converted to computer readable text. The interface 110 in FIG. 1, for example, may be used to receive the text. In some implementations, the system 100 may perform the ingestion of the documents and generation of text from the documents. For example, the system 100 may receive the electronic document or may capture an image of text in a document. For example, the interface 110 may receive one or more documents in an electronic format (such as in a pdf or tiff format). The system 100 may scan a document to determine locations of text in the document and convert the identified text to computer readable text. In some implementations, the system 100 may perform object character recognition (OCR) to obtain the text in the document.

The text, for example, may be unstructured, e.g., free-form text, such as found in benefit descriptions for credit cards, insurance, etc., or found in articles or reports. By way of example, credit card companies use free-form text to describe the benefits associated with a credit card. For example, the benefits may include purchase categories for which rewards are provided, such as reward points, miles, or cashback, as well as the magnitude of the reward. For example, a benefit description may state " . . . get 3× points when you spend on travel and groceries . . . earn 2× points on all electronic purchases through April, . . . Enjoy 3500 point bonus when you spend $4000 in the first 3 months. . . . " In another example, news articles may use free-form text such as " . . . CDC reported 10,000 new cases in New York last week. California, Oregon & Washington reported 5000-7000 cases and almost 5000 cases were reported in the states of Nevada, Arizona, and Utah, making these the highest COVID-19 infected states last week."

Topic segmentation of the text is performed with a trained topic segmentation model (204). Topic segmentation is a machine learning framework, in which the body of raw text is divided into smaller groups, e.g., segments, that correspond to distinct topics or subtopics. In some implementations, segments are in units of a sentence (with each sentence being a separate segment) corresponding to different topics or subtopics. Topic segmentation may be performed using one or more pre-trained, fine-tuned models, such as SECTOR, Transformer2, and BeamSeg. The topic segmentation model is trained based on the desired. The segments generated by the trained topic segmentation model may include two outputs, topic labels and segment labels. The topic labels, for example, may be the class name for each segment, and, by way of example, may be the column names for a table, e.g., a comma separate value (CSV) file, generated as the predicted output 208 by the framework 200 in FIG. 2A. The segment label, for example, points to the location from which a new topic starts, e.g., identifying if a new segment or topic starts. For example if there are four sentences in a chunk of text, then the topic label for the set of four sentences may be (a,a,b,b), e.g., the topic labels for the first two sentences is "a" and last two sentences is "b." In this case the segment label will be (0,0,1,0), since the third sentence marks the beginning of a new topic. In one implementation, the segment label may identify sub-topics. For instance, based on the above-example, there may be a situation where the sentence label is (0,0,1,1), which may indicate that the third sentence marks the beginning of a new topic, and the fourth sentence is a beginning of a new sub-topic. In this case, since the fourth sentence is also topic "b," this will symbolize that class b has multiple instances. The system 100 may store each segment in a separate data structure stored in the system 100 (such as in memory 135 or database 120), and each segment (stored in a data structure) is ready for entity extraction.

In one implementation, the architecture used for the topic segmentation model may be a transfer over a pre-trained transfer framework adapted for topic segmentation. In this framework, the output from a BERT Pre-trained transformer is provided as the input to another transformer. The first transformer may be used to obtain sentence embeddings from pairwise sentences. Each sentence embedding starts with a classification [CLS] token and is separated using a separator [SEP] token. The second transformer is a transformer encoder that outputs whether a sentence is a start of a new segment and also provides the label for the sentence. The second transformer may have, e.g., 24 self-attention heads and 2 layers. Each of the encoder layers may have a point-wise feed-forward layer of 1,024 dimensions.

Figure 3A:
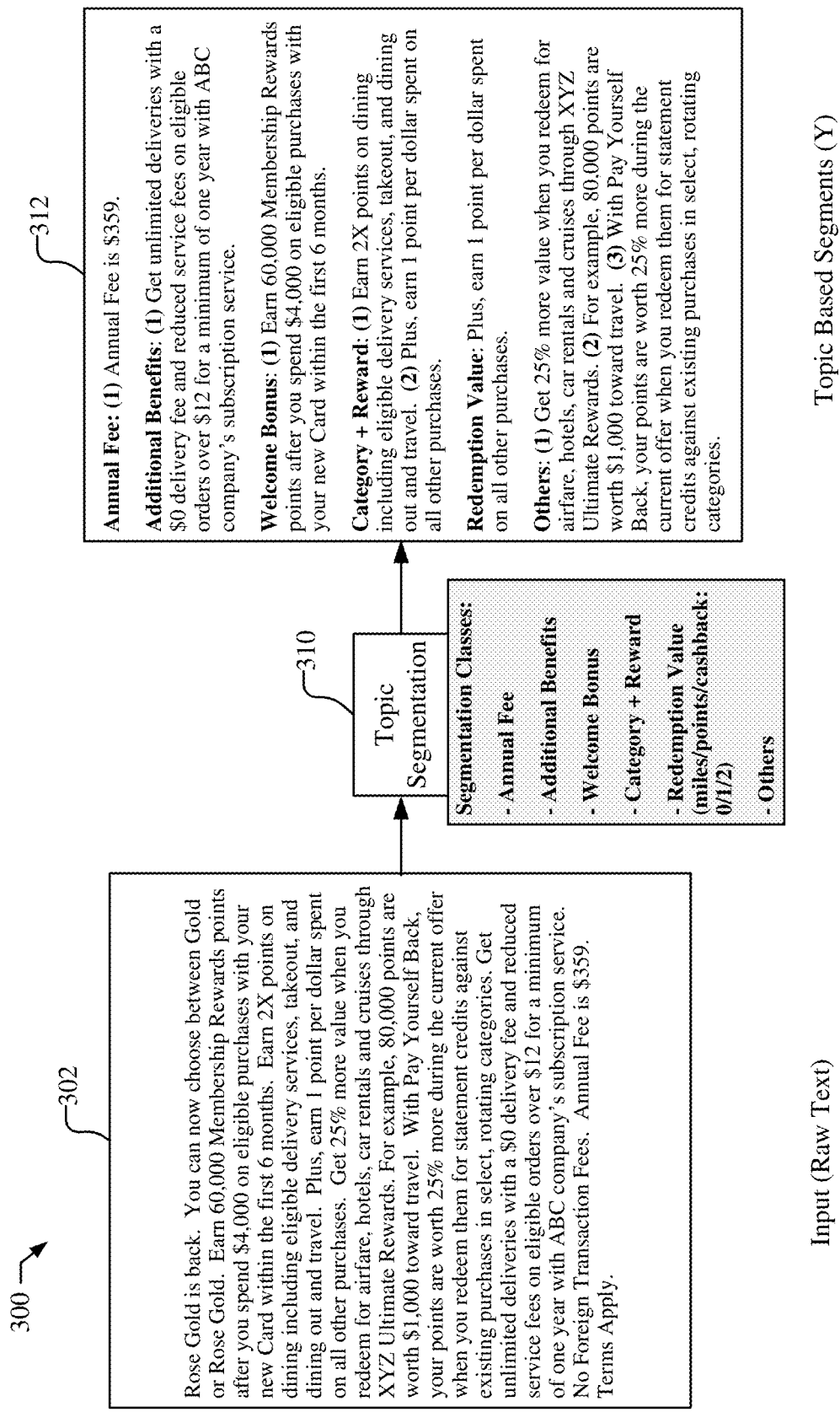
FIG. 3A illustrates an operation of a topic segmentation model, according to some implementations.

FIG. 3A, by way of example, illustrates operation 300 of a topic segmentation model 310, which may be used for the topic segmentation in block 204 of FIG. 2A. As illustrated, input data (raw text) 302 may be provided to the topic segmentation model 310. The input data 302 is illustrated in FIG. 3A as unstructured text directed to credit card benefits. The topic segmentation model 310 breaks the unstructured text into structured text, where segment (e.g., sentence) is given one topic label. The topic segmentation model 310 may be trained to segment the input data into a number of different topics or segmentation classes, e.g., such as "annual fee," "additional benefits," "welcome bonus," "category+reward," "redemption value," "others," etc. In some implementations, one or more of the topics may be divided into multiple sub-sections or sub-topics. For example, a topic such as annual fee may have sub-section for first year fee, and annual fee after the first year, and a topic such as welcome bonus may include sub-sections for the bonus amount and a threshold amount and time constraints. As illustrated, the topic segmentation model 310 produces topic based segments (Y) 312, with topic labels illustrated as "annual fee," "additional benefits," "welcome bonus," "category+reward," "redemption value," and "others," and segment labels for each topic, illustrated as (1) and (2) etc.

Referring back to FIG. 2A, entity extraction of each segment is performed with one or more trained entity extraction models (206) that receive individual topic based segments from the topic segmentation model as input data. The entity extraction model, for example, may be a pre-trained few-shot learning model, NER model, GPT3 model, and T5 model, or a combination thereof. With the topic segmentation model inserted in the pipeline between the raw text and the entity extraction model, the entity extraction model may generate more accurate predictions. The entity extraction model produces values for each topic or subtopic. For example, the extracted entities may be the values associated with each column name for the table generated as the predicted output 208 by the framework 200. In some implementations, relations between the extracted entities associated with each topic may be identified. For example, in credit card benefits text such as " . . . 4× in grocery and travel, 3× on gas stations, 5× on streaming subscription . . . " the entity extraction model may extract entities 4×, 3×, 5×, grocery, travel, gas stations, and streaming subscriptions, but additionally, the relations between these entities may be identified, e.g., (4×, grocery), (4×, travel), (3×, gas stations, and (5×, streaming subscriptions). In another example, in a news article containing text such as " . . . CDC reported 10,000 new cases in New York last week. California, Oregon & Washington reported 5000-7000 cases and almost 5000 cases were reported in the states of Nevada, Arizona, and Utah . . . " the entity extraction model may extract related entities may extract related entities (10000, New York), (5000-7000, California), (5000-7000, Oregon), (5000-7000, Washington), (5000, Nevada), (5000, Utah), and (5000, Arizona).

Figure 3B:
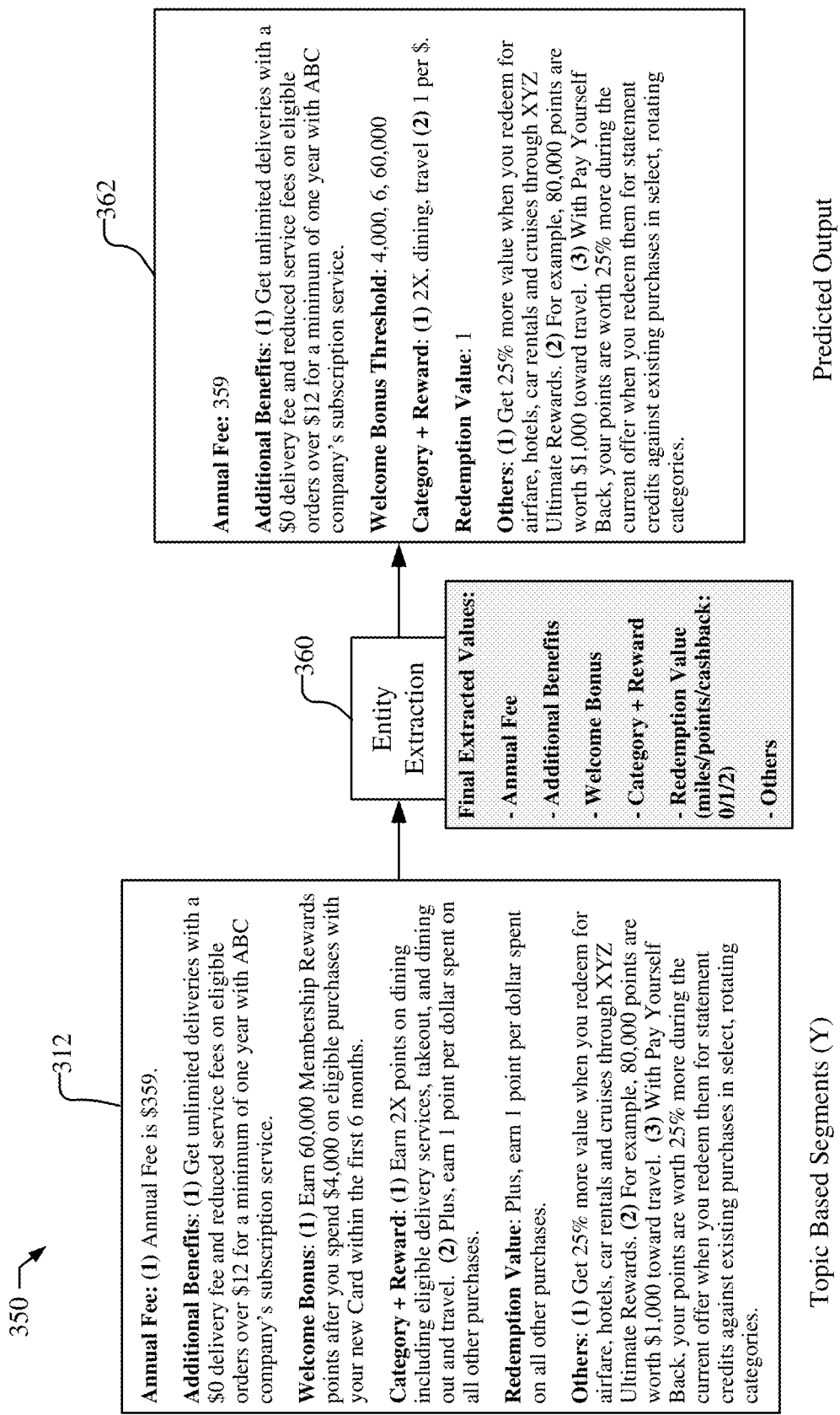
FIG. 3B illustrates an operation of an entity extraction model, according to some implementations.

FIG. 3B, by way of example, illustrates operation 350 of an entity extraction model 360, which may be used for the entity extraction in block 206 of FIG. 2A and used in conjunction with the operation 300 shown in FIG. 3A. As illustrated, the topic based segments (Y) 312 from the topic segmentation model 310 in FIG. 3A are provided as input data to the entity extraction model 360. Each topic may be individually provided to the entity extraction model 360, e.g., with all segments (sentences) associated with a particular topic provided as input to the entity extraction model 360. The entity extraction model 360 may be trained to extract specific entities for each different topic or subtopic, e.g., the entity extraction model 360 extracts the cell value (entities) for every topic instance (each segment (sentence) segments (sentences) associated with the topic), which may be directly in some mathematical calculations and/or SQL queries for evaluation. For example, the entity extraction model 360 may be trained to extract final values for "annual fee," "additional benefits," "welcome bonus," "category+reward," "redemption value," "others," etc. Topic segmentation basically breaks chunks of unstructured text into structured text, where each sentence is given one label. This label is the same as the column name. Then all the sentences associated to a particular label is given as input to the Entity Extraction model (360) and the cell value (entities) are extracted for every instance, which can be directly in some mathematical calculations/calculation or Structured Query Language (SQL) queries for evaluation. As illustrated, the entity extraction model 360 produces the predicted output 362 with entities extracted for each topic.

Referring back to FIG. 2A, the topic segments from block 204 and the extracted entities from the block 206 are provided to produce the predicted output 208, which, for example, may be a table (e.g., CSV file), with the topic segments provided as the column name and the extracted entities provided as the cell values for each column. The system 100 may store the predicted output 208, e.g., in memory 135 or database 120, and may provide the predicted output 208 to other onboard or external applications for analysis.

Figure 2B:
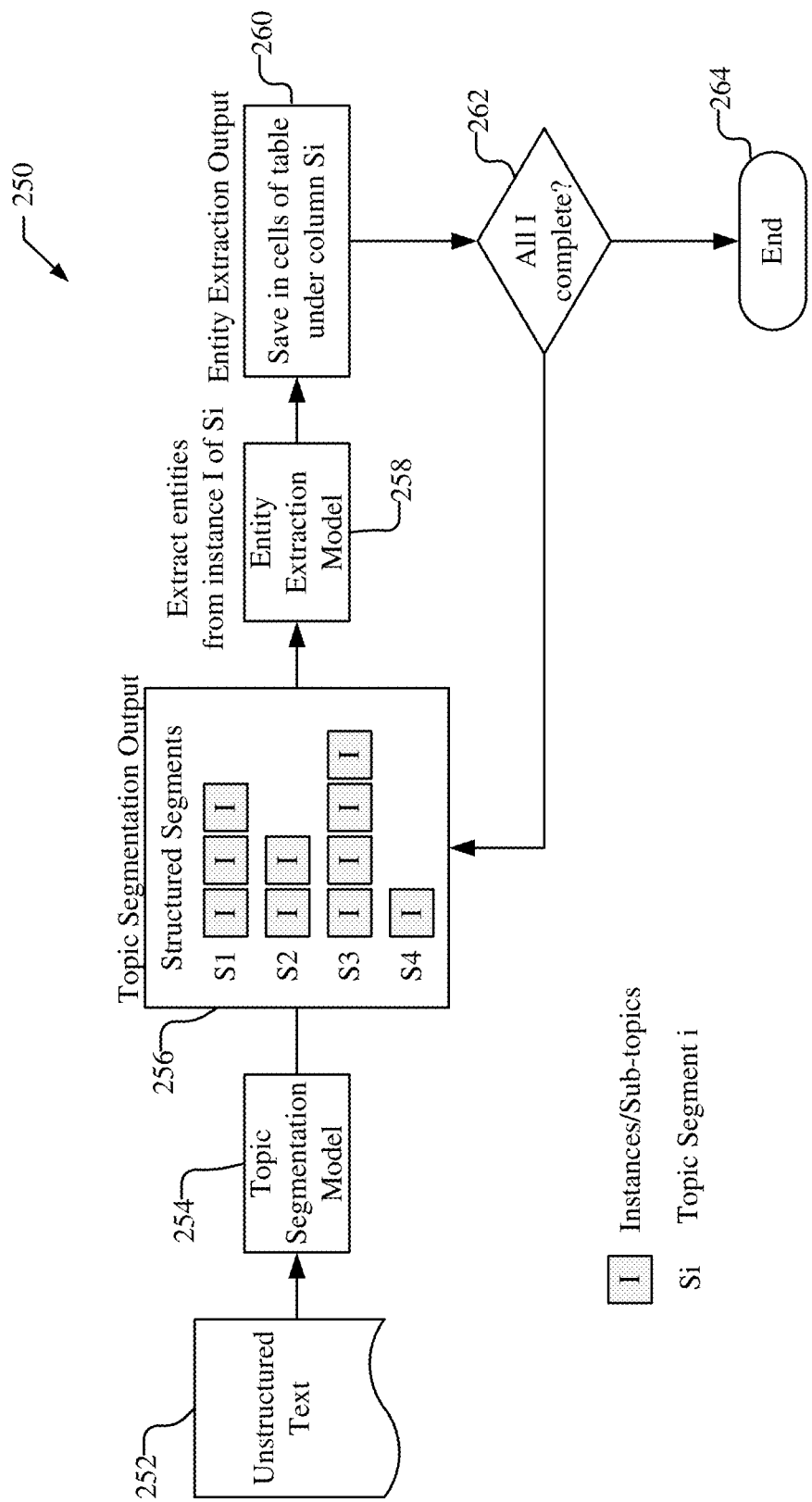
FIG. 2B illustrates an illustrative flow chart for a process using the framework shown in FIG. 2A for entity extraction, according to some implementations.

FIG. 2B illustrates an illustrative flow chart for a process 250 using the framework shown in FIG. 2A for entity extraction, according to some implementations. The process 250, for example, may be implemented by the system 100 using topic segmentation model 140, the entity extraction model 150, and database 120. It is to be understood that the process 250 may be performed by other suitable systems, computers, or servers.

As illustrated, unstructured text is obtained (252). As discussed above, the unstructured text may be computer readable text associated with a text capture of a document, such as a report or article, which may be ingested by the same or different computing system, e.g., as received image captures of paper documents, receiving pdfs, etc.).

A topic segmentation model 254, which may be an implementation of the topic segmentation model 140 shown in FIG. 1, performs topic segmentation of the unstructured text. The topic segmentation model 254, for example, may be a machine learning model trained to divide the unstructured text into smaller groups, e.g., segments, that correspond to distinct topics or subtopics. As illustrated by the topic segmentation output 256, the topic segmentation model 254 may segment the text into a plurality of segments $S_i$, where i is the index number, illustrated as 1-4 in FIG. 2B. Each of the segments $S_i$ may include one or more instances (or sub-topics) I.

The topic segmentation output 256 is provided to an entity extraction model 258, which may be an implementation of the entity extraction model 150 shown in FIG. 1. The entity extraction model 258 extracts entities from an instance I of a segment $S_i$ to produce values for each topic or instance/sub-topic. As illustrated, the entity extraction output 260 may be saved in cells of a table under the column for the segment $S_i$.

As illustrated by decision 262, if all instances I in the structured segments have not been completed, the process returns and the entity extraction model 258 extracts entities for the next instance I. If all instances I for all structured segments $S_i$ have been completed, the process may end 264.

Figure 4:
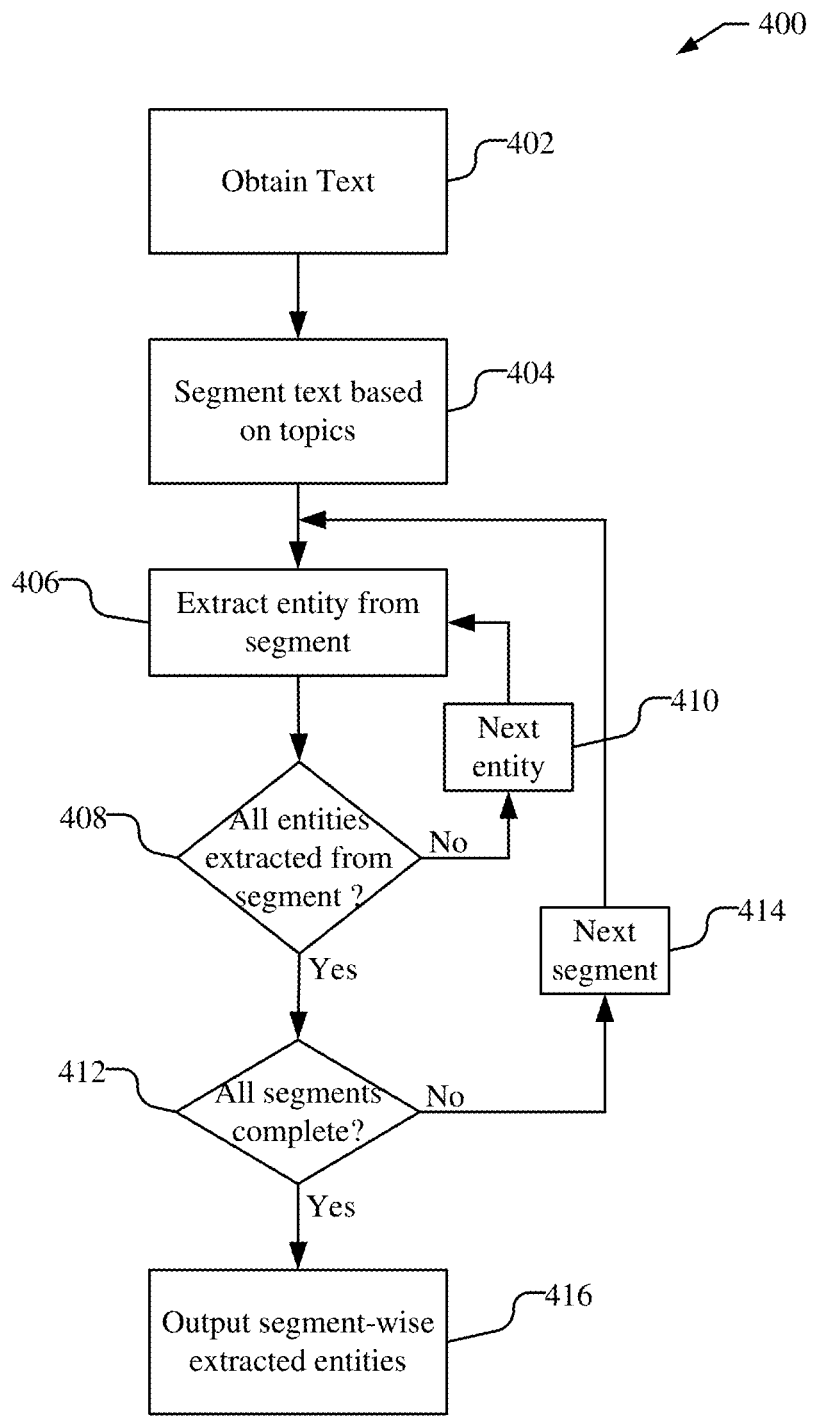
FIG. 4 illustrates an example process flow for entity extraction, according to some implementations.

FIG. 4 illustrates another example process flow 400 for entity extraction, according to some implementations. The process flow 400, for example, may be implemented by the system 100 using topic segmentation model 140, the entity extraction model 150, and database 120 and implementing framework 200. It is to be understood that the process flow 400 may be performed by other suitable systems, computers, or servers.

As illustrated, at block 402, unstructured text is obtained as discussed at block 202 of FIG. 2A. The text, for example, may be obtained by ingesting documents such as receiving image captures of paper documents, receiving pdfs, etc. and converting text to computer readable text.

At block 404, the unstructured text is segmented into structured segments based on topics to produce topic based segments, e.g., with the topic segmentation model, as discussed in reference to block 204 of FIG. 2A and operation 300 of FIG. 3A.

At block 406, entities are extracted from a structured segment based, e.g., with the entity extraction model, as discussed in reference to block 206 and operation 350 of FIG. 3B.

At block 408, it is determined whether all entities have been extracted from the segment. If all entities have not been extracted, the next entity (block 410) is extracted from the segment at block 406. If all entities have been extracted, the process flows to block 412.

At block 412, it is determined whether all segments have been completed, i.e., all segments have been analyzed by the entity extraction model. If all segments have not been completed, the next segment (block 414) is selected and entities are extracted from the new segment at block 406. If all segments have been completed, the process flows to block 416.

At block 416, the segment wise extracted entities are output, e.g., as discussed in in reference to block 208 of FIG. 2A.

Figure 5:
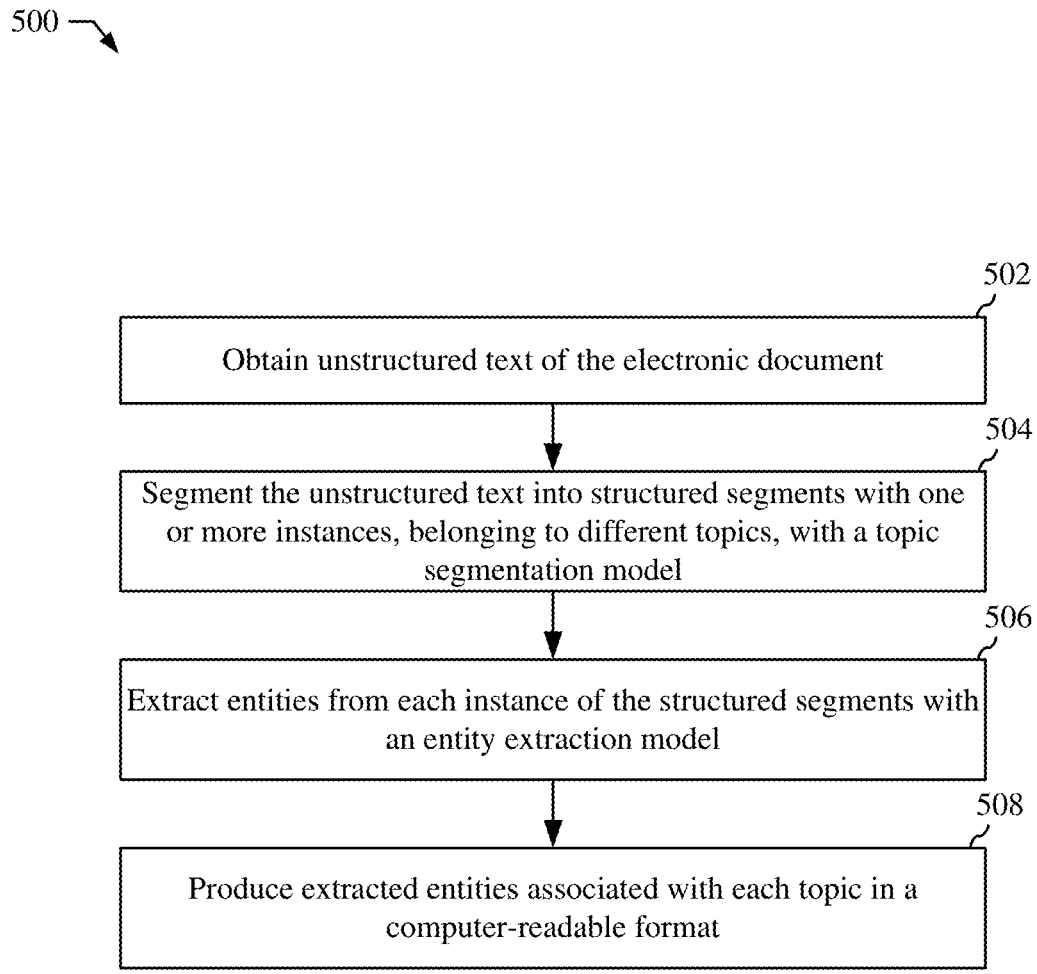
FIG. 5 shows an illustrative flowchart depicting an example operation for extracting text information from an electronic document, according to some implementations.

FIG. 5 shows an illustrative flowchart depicting an example computer implemented method 500 for extracting text information from an electronic document, according to some implementations. The example operation 500 is described as being performed by the system 100, such as by the one or more processors 130 executing instructions to perform operations associated with the components 140 and 150 of FIG. 1 and described in reference to framework 200 of FIG. 2A and operations 300 and 350 shown in FIGS. 3A and 3B, and the process flow 400 illustrated in FIG. 4.

At 502, the system 100 obtains unstructured text of an electronic document, e.g., as discussed in reference to block 202 of FIG. 2A, and block 402 of FIG. 4.

At 504, the system 100 segments the unstructured text into structured segments, with one or more instances, belonging to different topics with a topic segmentation model, e.g., as discussed in reference to block 204 of FIG. 2A, operation 300 of FIG. 3A, and block 404 of FIG. 4.

At 506, the system 100 extracts entities from each instance of the structured segments with an entity extraction model, e.g., as discussed in reference to block 206, operation 350 of FIG. 3B, and blocks 406-412 of FIG. 4. In some implementations, one or more of the different topics includes multiple sub-sections, and the extracted entities are associated with each sub-section within each topic. In some implementations, the system 100 may extract entities from each instance of the structured segments by operating on a first segment to extract all entities from each instance in the first segment before operating on a second segment, e.g., as discussed in reference to blocks 406-412 of FIG. 4. In some implementations, entities are assigned to each topic and entities are extracted from each instance of the structured segments by extracting only entities that are related to the topic associated with each respective structured segment.

At 508, the system 100 produces extracted entities associated with each topic in a computer-readable format, e.g., as discussed in reference to block 208 of FIG. 2A, and block 416 of FIG. 4. In some implementations, the system 100 produces extracted entities associated with each topic in the computer-readable format by identifying relations between the extracted entities associated with each topic.

In some implementations, the topic segmentation model includes at least one of SECTOR, Transformer2, and BeamSeg, and the entity extraction model comprises at least one of a few-shot learning model, Named-Entity Recognition (NER), Generative Pre-trained Transformer 3 (GPT3), and T5.

As used herein, a phrase referring to "at least one of" a list of items refers to any combination of those items, including single members. As an example, "at least one of: a, b, or c" is intended to cover: a, b, c, a-b, a-c, b-c, and a-b-c.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The various illustrative logics, logical blocks, modules, circuits, and algorithm processes described in connection with the implementations disclosed herein may be implemented as electronic hardware, computer software, or combinations of both. The interchangeability of hardware and software has been described generally in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A computer-implemented method for extracting text information from an electronic document, comprising:
   obtaining unstructured text of the electronic document;
   segmenting the unstructured text into structured segments with one or more instances, belonging to different topics, with a topic segmentation model;
   extracting entities from each instance of the structured segments with an entity extraction model, wherein extracting entities from each instance of the structured segments comprises operating on a first segment to extract all entities from each instance in the first segment before operating on a second segment; and
   producing extracted entities associated with each topic in a computer-readable format.

2. The computer-implemented method of claim 1, wherein one or more of the different topics includes multiple sub-sections, and wherein the extracted entities are associated with each sub-section within each topic.

3. The computer-implemented method of claim 1, wherein entities are assigned to each topic, wherein extracting entities from each instance of the structured segments comprises extracting only entities that are related to a topic associated with each respective structured segment.

4. The computer-implemented method of claim 1, wherein producing the extracted entities associated with each topic in the computer-readable format comprises identifying relations between the extracted entities associated with each topic.

5. The computer-implemented method of claim 1, wherein the topic segmentation model comprises at least one of SECTOR, Transformer2, and BeamSeg, and the entity extraction model comprises at least one of a few-shot learning model, Named-Entity Recognition (NER), Generative Pre-trained Transformer 3 (GPT3), and T5 (Text-to-Text Transfer Transformer).

6. A system for extracting text information from an electronic document, comprising:
   one or more processors; and
   a memory coupled to the one or more processors and storing instructions that, when executed by the one or more processors, cause the system to perform operations comprising:
   obtain unstructured text of the electronic document;
   segment the unstructured text into structured segments with one or more instances, belonging to different topics, with a topic segmentation model;
   extract entities from each instance of the structured segments with an entity extraction model, wherein the system is caused to extract entities from each instance of the structured segments by being caused to operate on a first segment to extract all entities from each instance in the first segment before operating on a second segment; and produce extracted entities associated with each topic in a computer-readable format.

7. The system of claim 6, wherein one or more of the different topics includes multiple sub-sections, and wherein the extracted entities are associated with each sub-section within each topic.

8. The system of claim 6, wherein entities are assigned to each topic, wherein the system is caused to extract entities from each instance of the structured segments by being caused to extract only entities that are related to a topic associated with each respective structured segment.

9. The system of claim 6, wherein the system is caused to produce the extracted entities associated with each topic in the computer-readable format by being caused to identify relations between the extracted entities associated with each topic.

10. The system of claim 6, wherein the topic segmentation model comprises at least one of SECTOR, Transformer2, and BeamSeg, and the entity extraction model comprises at least one of a few-shot learning model, Named-Entity Recognition (NER), Generative Pre-trained Transformer 3 (GPT3), and T5 (Text-to-Text Transfer Transformer).

11. A system for extracting text information from an electronic document, comprising:

an interface configured to obtain unstructured text of the electronic document;

a topic segmentation model configured to segment the unstructured text into structured segments, with one or more instances, belonging to different topics; and an entity extraction model configured to extract entities from each instance of the structured segments and to produce extracted entities associated with each topic in a computer-readable format, wherein the entity extraction model is configured to extract entities from each instance of the structured segments by operating on a first segment to extract all entities from each instance in the first segment before operating on a second segment.

12. The system of claim 11, wherein one or more of the different topics includes multiple sub-sections, and wherein the extracted entities are associated with each sub-section within each topic.

13. The system of claim 11, wherein entities are assigned to each topic, wherein the entity extraction model is configured to extract entities from each instance of the structured segments by extracting only entities that are related to a topic associated with each respective structured segment.

14. The system of claim 11, wherein entity extraction model is configured to produce extracted entities associated with each topic in the computer-readable format by identifying relations between the extracted entities associated with each topic.

15. The system of claim 11, wherein the topic segmentation model comprises at least one of SECTOR, Transformer2, and BeamSeg, and the entity extraction model comprises at least one of a few-shot learning model, Named-Entity Recognition (NER), Generative Pre-trained Transformer 3 (GPT3), and T5 (Text-to-Text Transfer Transformer).

\* \* \* \* \*